(12) United States Patent
Stewart et al.

(10) Patent No.: US 9,369,658 B2
(45) Date of Patent: Jun. 14, 2016

(54) IMAGE CORRECTION OF SURFACE PROJECTED IMAGE

(71) Applicant: Lenovo (Singapore) Pte. Ltd., Singapore (SG)

(72) Inventors: Aaron Michael Stewart, Raleigh, NC (US); Howard J. Locker, Cary, NC (US); John Weldon Nicholson, Cary, NC (US); Michaela Rose Case, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 115 days.

(21) Appl. No.: 14/159,013

(22) Filed: Jan. 20, 2014

(65) Prior Publication Data

US 2015/0208019 A1  Jul. 23, 2015

(51) Int. Cl.

| | |
|---|---|
| *G03B 21/26* | (2006.01) |
| *H04N 5/74* | (2006.01) |
| *G06F 3/03* | (2006.01) |
| *G06F 1/16* | (2006.01) |
| *G06F 3/01* | (2006.01) |
| *G06F 3/042* | (2006.01) |
| *H04N 9/31* | (2006.01) |
| *G02B 27/01* | (2006.01) |

(52) U.S. Cl.
CPC .............. *H04N 5/7416* (2013.01); *G03B 21/26* (2013.01); *G06F 1/1673* (2013.01); *G06F 1/1694* (2013.01); *G06F 3/013* (2013.01); *G06F 3/0304* (2013.01); *G06F 3/0426* (2013.01); *H04N 9/3173* (2013.01); *H04N 9/3185* (2013.01); *H04N 9/3194* (2013.01); *G02B 27/017* (2013.01); *G02B 2027/014* (2013.01); *G02B 2027/0138* (2013.01); *G02B 2027/0178* (2013.01); *G06F 2200/1637* (2013.01)

(58) Field of Classification Search
CPC ..... G03B 21/26; H04N 9/0459; H04N 9/3173
USPC ........ 353/28, 30, 69, 70, 121; 348/42, 44, 51, 348/743–747; 345/156, 501
See application file for complete search history.

(56) References Cited

U.S. PATENT DOCUMENTS

| 8,820,937 | B2 * | 9/2014 | Osterman | G02B 27/26 349/8 |
|---|---|---|---|---|
| 2003/0164927 | A1 * | 9/2003 | Tsukada | 353/31 |
| 2005/0068501 | A1 * | 3/2005 | Nonaka | G03B 21/26 353/30 |
| 2012/0017147 | A1 * | 1/2012 | Mark | 715/702 |
| 2012/0200588 | A1 * | 8/2012 | Posa et al. | 345/589 |
| 2012/0320343 | A1 * | 12/2012 | Papaefstathiou et al. | 353/98 |

OTHER PUBLICATIONS

Texas Instruments, DLP Pico Projectors 2013 (1 page).
Tobii Technology Company Brochure 2013 (12 pages).
Texas Instruments, DLP3000, DLPC300 Data Manual 2013 (20 pages).

* cited by examiner

*Primary Examiner* — Sultan Chowdhury
(74) *Attorney, Agent, or Firm* — Brian J. Pangrle

(57) ABSTRACT

A method can include determining characteristics of a surface; determining a point of view for an object with respect to the surface; and projecting an adjusted image onto the surface, the adjusted image being adjusted based at least in part on the characteristics of the surface and the point of view for the object with respect to the surface. Various other methods, apparatuses, systems, etc., are also disclosed.

21 Claims, 10 Drawing Sheets

Method 550

Sense 552     Analyze 554     Project 556

IMAGE CORRECTION OF SURFACE PROJECTED IMAGE

TECHNICAL FIELD

Subject matter disclosed herein generally relates to image correction.

BACKGROUND

People use display devices and projectors in various environments. Viewing experience of displayed information can depend on various factors, some of which may change over time.

SUMMARY

A method can include determining characteristics of a surface; determining a point of view for an object with respect to the surface; and projecting an adjusted image onto the surface, the adjusted image being adjusted based at least in part on the characteristics of the surface and the point of view for the object with respect to the surface. Various other methods, apparatuses, systems, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

Figure 1:
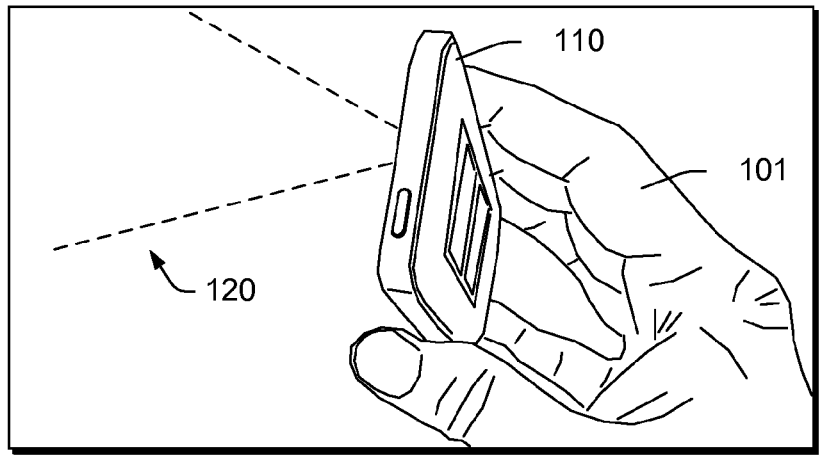
FIG. 1 is a series of diagram of an example of a device.
Figure 1:
Figure 1:
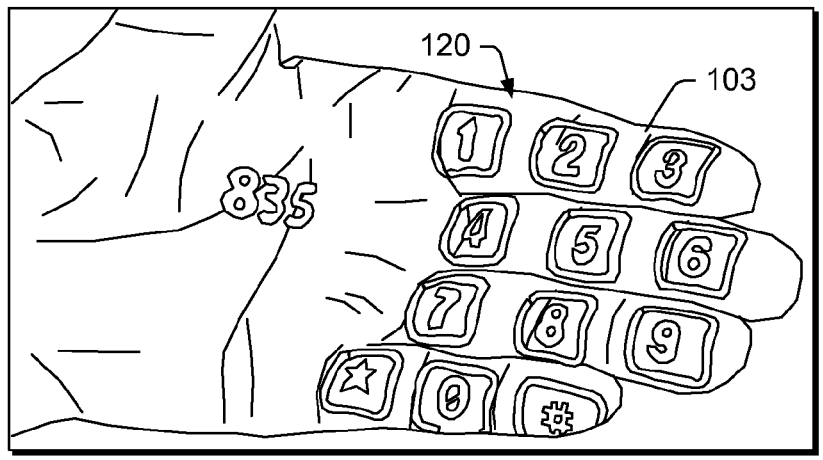

The following description includes the best mode presently contemplated for practicing the described implementations. This description is not to be taken in a limiting sense, but rather is made merely for the purpose of describing general principles of various implementations. The scope of invention should be ascertained with reference to issued claims.

As mentioned, people use display devices and projectors in various environments. Viewing experience of displayed information can depend on various factors, some of which may change over time. For example, orientation of a projector may change with respect to a projection surface and, for example, orientation of a viewer may change with respect to a projection surface. Further, a projection surface may be multifaceted, non-planar, dynamic, etc. For example, a projection surface may be a surface of a malleable object, a portion of a human body, etc. As to display devices, flexible displays exists as well do curved displays. For example, a smart phone, a tablet or other mobile computing device may include a flexible display, a curved display, etc.

Viewing experience can depend on objective and/or subjective measures of visual quality. As an example, a device may include circuitry that dynamically adapts an image to enhance or maintain visual quality. As an example, such circuitry may account for characteristics of a display surface. For example, such circuitry may sense information to characterize a changing surface and then correct an image or series of images such that displayed content appear relatively unaffected to a viewer. For example, consider circuitry that can correct an image of a projector that projects the image to a body part, to a wall as a viewer moves with respect to the wall, to a wall as the projector moves with respect to the wall, etc.

As an example, circuitry may include circuitry that can implement one or more keystoning algorithms. For example, such circuitry may receive sensed information that can characterize a surface and based on such information correct an image. Such an approach may provide for image correction based at least in part on a principal axis of a projector being other than normal to a flat surface like a projection screen. Further, such an approach may provide for image correction where a surface is non-planar, multifaceted, curved, etc.

As an example, a system can include one or more sensors that can sense one or more environmental characteristics. For example, consider one or more sensors for sensing colors, surfaces, contours, etc. and, for example, a user viewing angle. As an example, a user viewing angle may be an assumed angle and/or a determined angle. For example, for a smart phone, an assumption may be that a viewer is positioned in front of a display surface of the smart phone. As an example, a viewing perspective, or point of view, may be assumed and/or determined based on, for example, orientation of a device (e.g., via an accelerometer, a gyroscope, etc.).

As an example, a system may implement display technology such as, for example, a LCD, a projector, a flexible OLED, etc. As an example, a system may implement multiple displays (e.g., consider an array of displays). As an example, a system may include one or more sensors for sensing distance such as distances of points on a surface or surfaces. For example, by using depth sensors, a system may determine one or more contours of a surface or surfaces and, for example, an image may be corrected based in part on depth information and, for example, a viewer's perspective. As an example, a system may include circuitry that can dynamically adjust an image or series of images (e.g., video images), for example, to produce a relatively constant image for viewing by a viewer.

As an example, multidimensional depth (e.g., three-dimensional) and structured lighting may be used to determine shape of a surface. As an example, by using such information, a displayed image may be corrected (e.g., curved, keystoned, manipulated, etc.) to fit the shape of the surface. As an example, such a process may produce an image that appears to be planar (e.g., flat) to a viewer.

As an example, sensor circuitry may include processing of sensed information. As an example, a system may implement one or more depth sensing techniques (e.g., using a structured light camera, a time of flight camera, a LIDAR (e.g., laser-based, etc.), an ultrasonic rangefinder, an IR or other rangefinder, etc.). As an example, a system may implement one or more geometric registration techniques. As an example, a system may determine one or more fiduciary points and optionally track such points, for example, with respect to time, with respect to a point of view of a viewer, with respect to a location of a projector with respect to a surface, etc. As an example, a fiduciary point may be a point associated with a surface, a viewer, a projector, etc.

As an example, a system may implement an algorithm akin to an algorithm that converts structured light image into a depth map. For example, a system may implement an inverse algorithm such that an image may be projected image as a corrected image with reference to a grid, which may be a regular grid (e.g., that corrects the image as transformed from a grid associated with a surface). As an example, an algorithm may include one or more equations such as, for example, one or more equations adapted from those for astronomical observations to correct for lens distortions, video games for texture mapping and development, etc. As an example, a system may implement image warping. For example, projection circuitry may include circuitry to perform image warping.

As to a grid, as an example, a grid may be projected onto a surface, which may be a surface of a viewer and/or a projection surface. In such an example, the grid may be projected using energy with a wavelength that is in a visible portion of the electromagnetic spectrum and/or using energy with wavelength that is in a non-visible portion of the electromagnetic spectrum. As an example, a sensor may capture an image of the grid and circuitry may analyze the image of the grid for purposes of image correction. As an example, a system may include a scanner, for example, consider a laser scanner that can scan a surface, which may be a surface of a viewer and/or a projection surface. In such an example, the system may analyze scan information for purposes of image correction. As an example, pressure energy (e.g., echo techniques) may be implemented to determine one or more characteristics of a surface, location of a viewer (e.g., as to a point of view), location of a projector (e.g., as to a projection angle, etc.), etc.

FIG. 1 shows an example of a hand 101 holding a device 110 that can project an image 120. In the example of FIG. 1, the device 110 can include one or more processors 112, memory 114 and a projector 115. For example, the memory 114 may be operatively coupled to the processor 112 and the projector 115 may be operatively coupled to the processor 112 such that, for example, the processor 112 may cause information stored in the memory 114 to be projected by the projector 115.

In the example of FIG. 1, another hand 103 may be used as a projection surface. In such an example, the device 110 may project the image 120 to the hand 103. As shown in the example of FIG. 1, the image 120 is distorted due to, for example, contours of the fingers, the palm, etc. of the hand 103. The distortion may detract from a user's experience. Further, as an example, where the image 120 is associated with an input technique, for example, where a user may touch one or more of the projected numbers of the image 120 (e.g., as part of a user interface), the uneven surface of the hand 103 and the resulting distorted image 120 may possibly lead to input errors. For example, where a user attempts to enter a phone number using the image 120, distortion of the image 120 as projected onto the hand 103 may lead to input of a wrong phone number.

Figure 2:
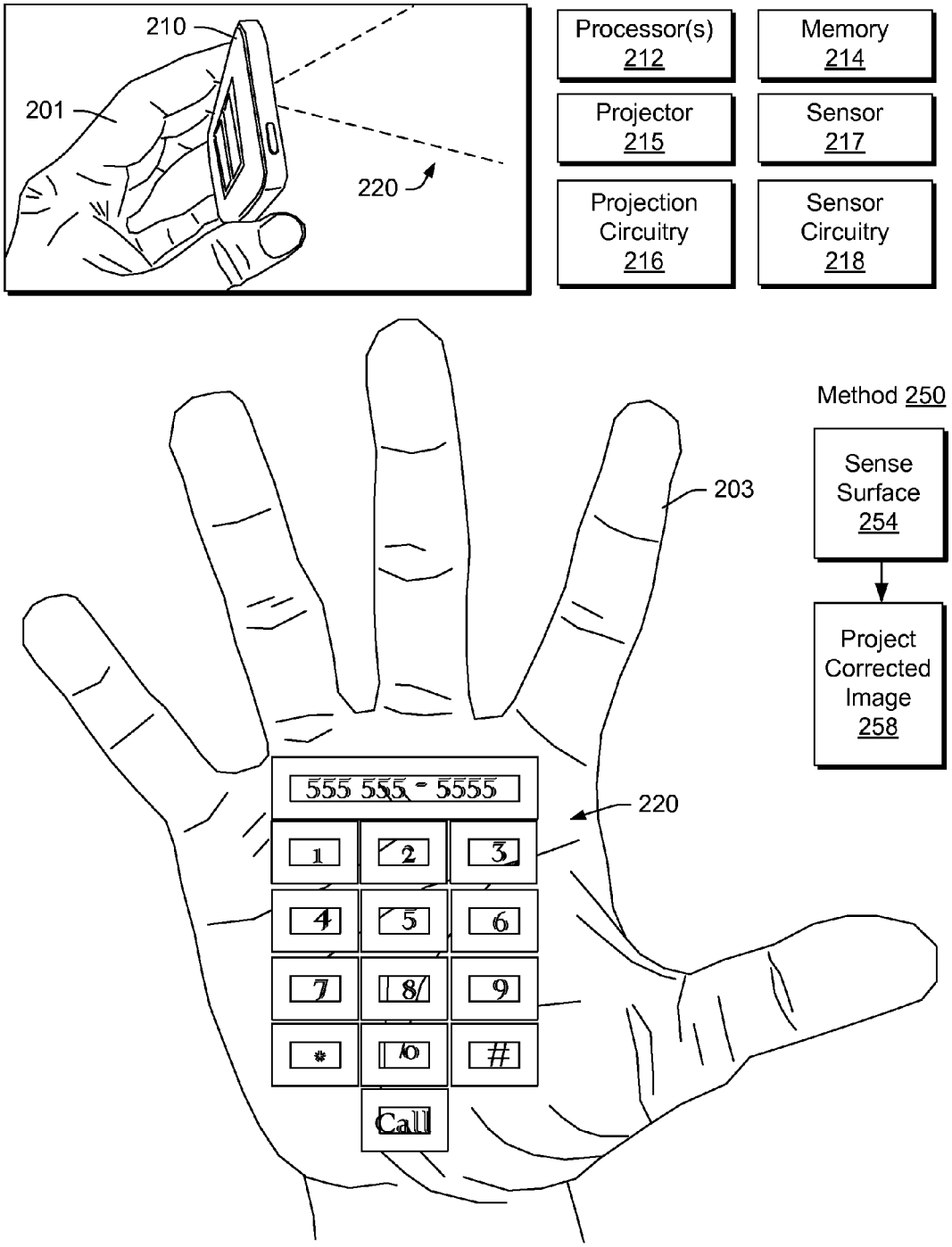
FIG. 2 is a series of diagram of an example of a device and an example of a method.

FIG. 2 shows an example of a hand 201 holding a device 210 that can project a corrected image 220. In the example of FIG. 2, the device 210 can include one or more processors 212, memory 214, a projector 215, projection circuitry 216, one or more sensors 217 and sensor circuitry 218. For example, the memory 214 may be operatively coupled to the processor 212 and the projector 215 may be operatively coupled to the processor 212 such that, for example, the processor 212 may cause information stored in the memory 214 to be projected by the projector 215. Further, the projection circuitry 216, the sensor 217 and the sensor circuitry 218 may be operatively coupled to the processor 212 such that sensed information may be processed to instruct the projection circuitry 216 to project a corrected image via the projector 215. In such an example, the projection circuitry 216 may be configured to implement one or more algorithms that can correct an image based at least in part on sensed information about a surface (e.g., as provided via the sensor 217 and the sensor circuitry 218).

In the example of FIG. 2, another hand 203 may be used as a projection surface. In such an example, the device 210 may project the image 220 to the hand 203. As shown in the example of FIG. 2, the image 220 is corrected to account for contours of the palm, etc. of the hand 203. As an example, the image 220 may be associated with an input technique, for example, where a user may touch one or more of the projected numbers of the image 220 (e.g., as part of a user interface). In such an example, the uneven surface of the hand 203 may be taken into account, for example, to possibly reduce input errors. For example, where a user attempts to enter a phone number using the image 220, information used to correct the image 220 onto the hand 203 may enhance accuracy of user input (e.g., to avoid risk of entering a wrong phone number).

FIG. 2 also shows an example of a method 250 that includes a sense block 254 for sensing one or more characteristics of a surface and a projection block 258 for projecting a corrected image to the surface where image correction is based at least in part on one or more sensed characteristics of the surface.

Figure 3:
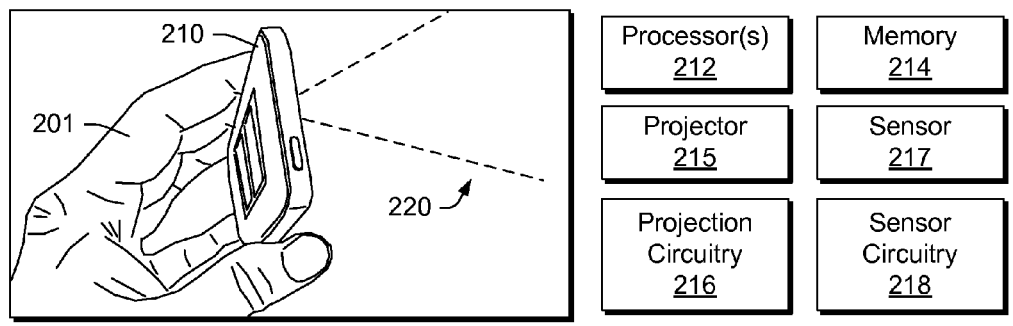
FIG. 3 is a series of diagram of the device of FIG. 2 and an example of a method.
Figure 3:
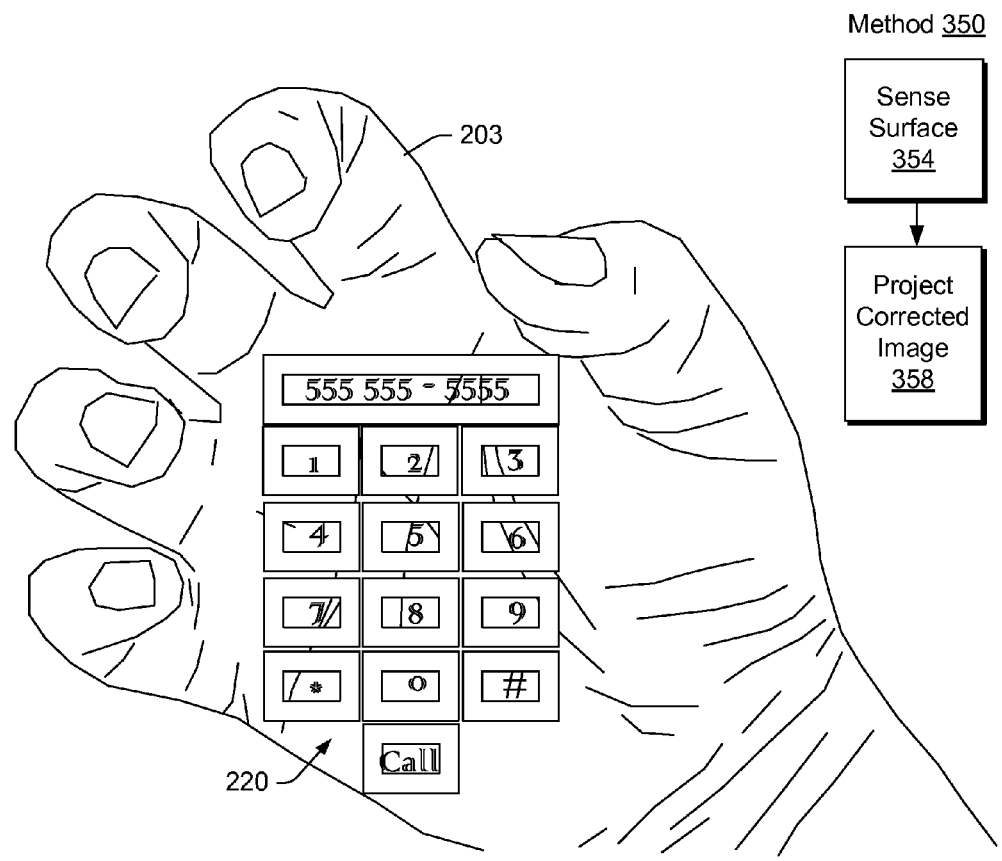

FIG. 3 shows an example scenario akin to that of FIG. 2, however, for the hand 203 in a different position. For example, a user may be in an environment with bright light and may close in fingers of the hand 203 to shade a palm surface of the hand 203 for purposes of creating a more suitable projection surface (e.g., with respect to ambient lighting). In such an example, as shown, a method 350 may include a sense block 354 for sensing one or more characteristics of the surface of the hand 203 and a projection block 258 for projecting the corrected image 220 to the surface of the hand 203 where image correction is based at least in part on one or more sensed characteristics of the surface of the hand 203.

As an example, a method may include sensing an intensity of light of a surface and, for example, sensing an intensity of ambient light. In such an example, the method may include determining an intensity differential, which may, for example, infer that a user of a device is attempting to increase contrast, shade a surface from ambient light, etc. As an example, a method may include projecting a corrected image with an intensity that is based at least in part on a measured intensity of light (e.g., light intensity of a surface, intensity of ambient light, an intensity differential, etc.).

Figure 4:
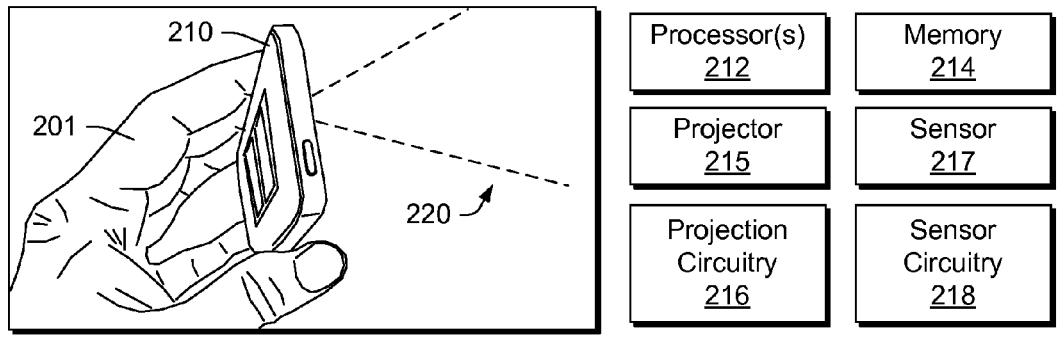
FIG. 4 is a series of diagram of the device of FIG. 2 and an example of a method.
Figure 4:
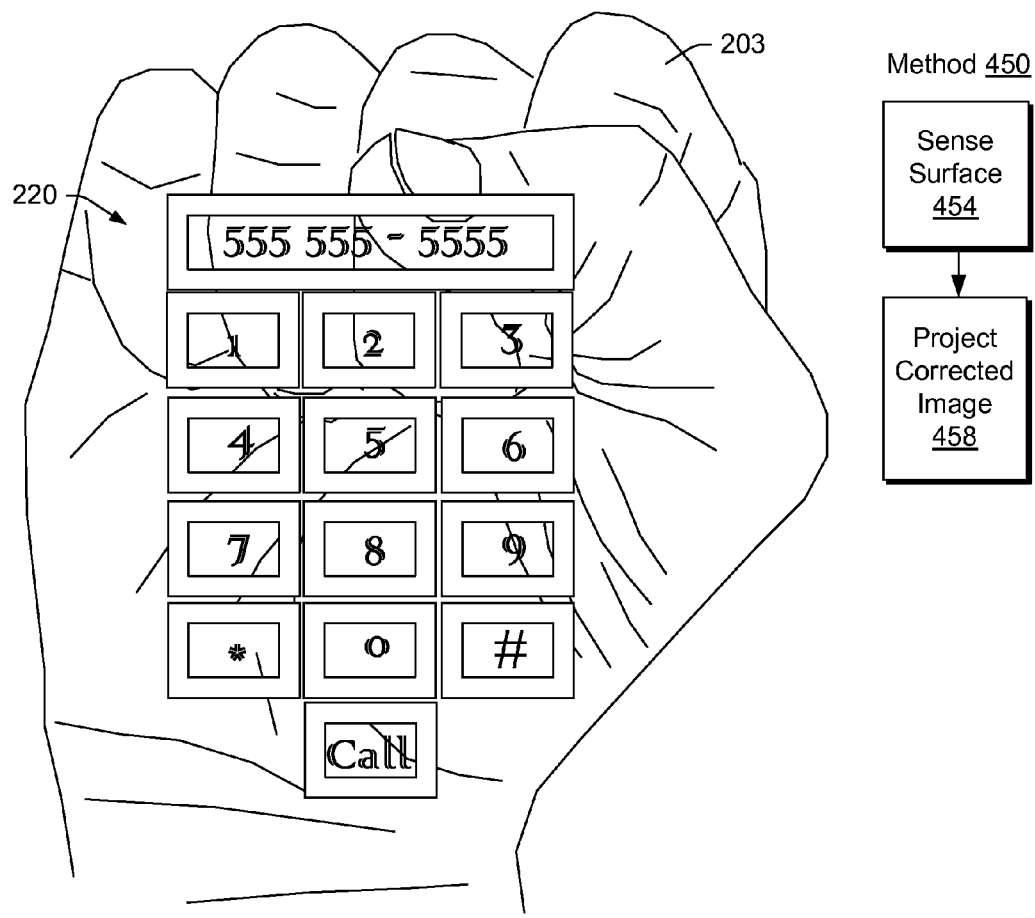

FIG. 4 shows an example scenario akin to that of FIG. 2, however, for the hand 203 in a different position. As an example, a person may find that she can maintain hand stability more readily with a closed hand compared to an open hand. Thus, as an example, a user may position a closed hand for use as a projection surface. As shown in the example of FIG. 4, the hand 203 is closed. In such an example, as shown, a method 450 may include a sense block 454 for sensing one or more characteristics of the surface of the hand 203 and a projection block 458 for projecting the corrected image 220 to the surface of the hand 203 where image correction is based at least in part on one or more sensed characteristics of the surface of the hand 203.

As an example, a method may include sensing movement of a surface. In such an example, the method may include determining jitter, a movement pattern, etc., which may, for example, be associated with a body part that is being used as a projection surface. As an example, a method may include projecting a corrected image with motion compensation that is based at least in part on measured movement (e.g., position with respect to time) of a surface onto which the corrected image is projected.

Figure 5:
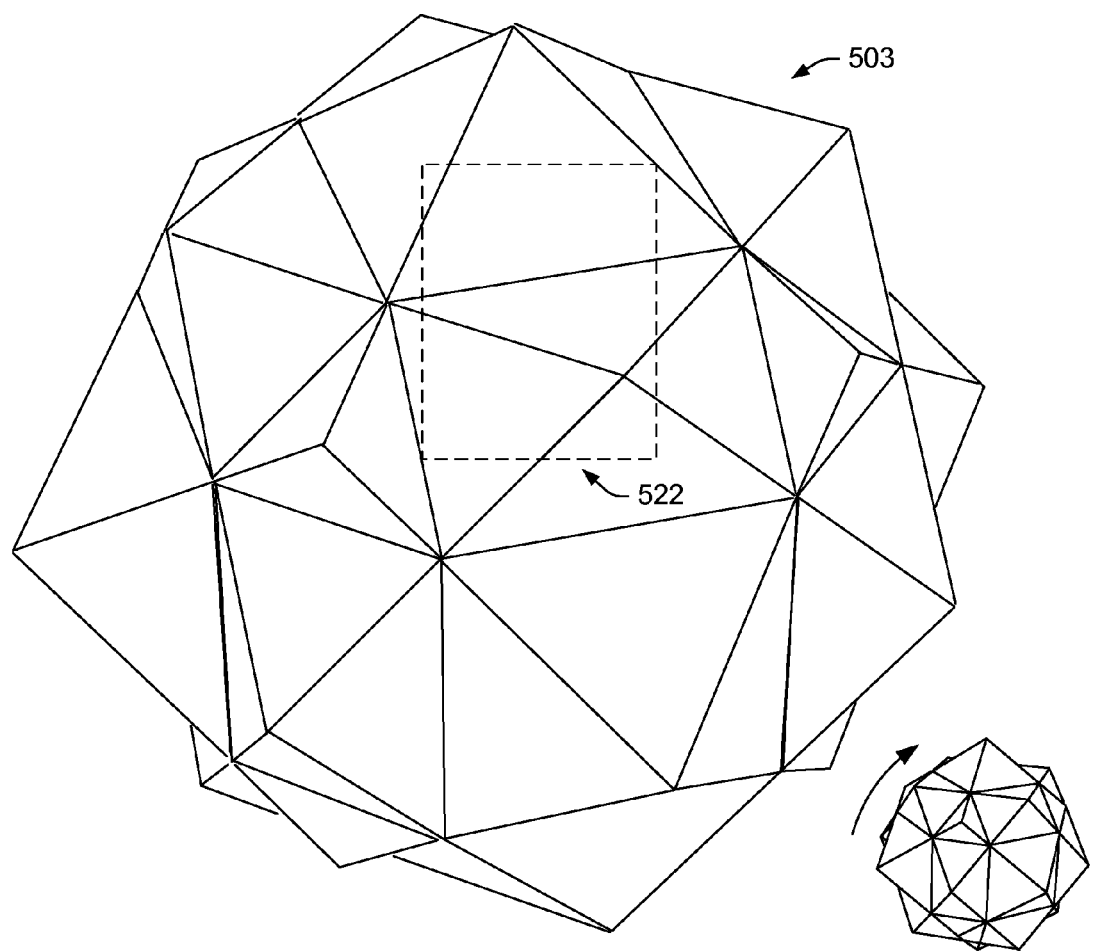
FIG. 5 is a diagram of an example of a multifaceted surface and an example of a method.
Figure 5:
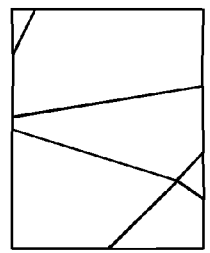
Figure 5:
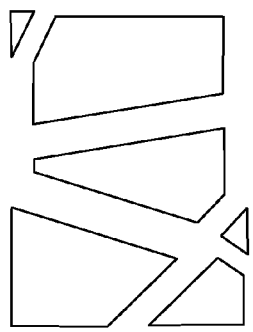
Figure 5:
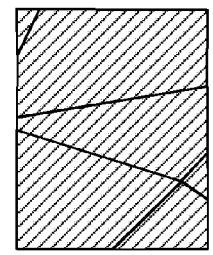

As mentioned, a surface may be multifaceted. FIG. 5 shows an example of a multifaceted surface 503, which may be, for example, a multifaceted surface of a polyhedron. As an example, where a polyhedron may be a known type of polyhedron, a method may include identifying the polyhedron based in part on sensed information. For example, based on sampling of a surface, a method may include determining that the surface belongs to an object with a particular shape. As an example, such an object may be defined, or at least a portion of it defined, by one or more equations. In such an example, the one or more equations may facilitate processing, for example, to reduce latency in correcting an image (e.g., a still image, a video image, etc.).

In the example of FIG. 5, an image boundary 522 is shown for a rectangular shaped image that may be projected onto the multifaceted surface 503. FIG. 5 also shows an example of a method 550 that may include sensing information 552, analyzing sensed information 554 and projecting a corrected image 556, for example, based at least in part on the analysis of sensed information.

As shown in FIG. 5, the image boundary 522 includes portions of six individual facets of the multifaceted surface 503. As an example, sensing may include sensing at least three points of a surface to determine a plane for the surface (e.g., an equation for a plane as defined by three points in space). As an example, sensing may occur with a sensing resolution or sensing resolutions, for example, based in part on an edge detection mechanism. For example, sensing may include capturing an image of the multifaceted surface 503 and processing the captured image (e.g., image data) using one or more edge detection algorithms (e.g., Sobel filter, etc.). As an example, edges may define regions, which may be, for example, facets (e.g., planes). In such an example, sensing may be performed based at least in part on facet size (e.g., a smallest facet size) and sensed information for each of the facets may be used (e.g., analyzed) to define each of the facets, for example, using a three-point equation for a plane (e.g., to define at least facet angle). As an example, a corrected image may be a mosaic where each tile of the mosaic corresponds to an individual facet of a multifaceted surface. In such an example, each tile may be processed using an algorithm such as, for example, a keystoning algorithm, to correct the tile (e.g., with respect to facet angle, facet boundaries, etc.). As an example, a method may include projecting multiple tiles onto a multifaceted surface to form a mosaic where the mosaic is a corrected image.

As an example, a method may include sensing light intensity of one or more facets of a multifaceted surface. In such an example, sensed light intensity may be used to correct an image, for example, with respect to intensity, optionally on a facet-by-facet basis. For example, if multifaceted surface is subject to ambient light emanating from a certain direction, the ambient light may cause surface shading. In such an example, projecting of an image onto the multifaceted surface may result in uneven image intensity for a viewer, for example, that may depend on the point of view of the viewer. As an example, a method may include correcting an image with respect to shading of a multifaceted surface, for example, to present a more even image intensity for a viewer.

As an example, a surface may be characterized by one or more characteristics. For example, each facet of the multifaceted surface 503 may be characterized by one or more of a facet angle (e.g., in a three-dimensional space), a facet border or facet boundary, a facet intensity, a facet shading, a facet color, a facet orientation with respect to an ambient light source, a facet orientation with respect to a projector, a facet orientation with respect to a viewer, a facet orientation with respect to an object of which the facet is a part thereof, etc.

Figure 6:
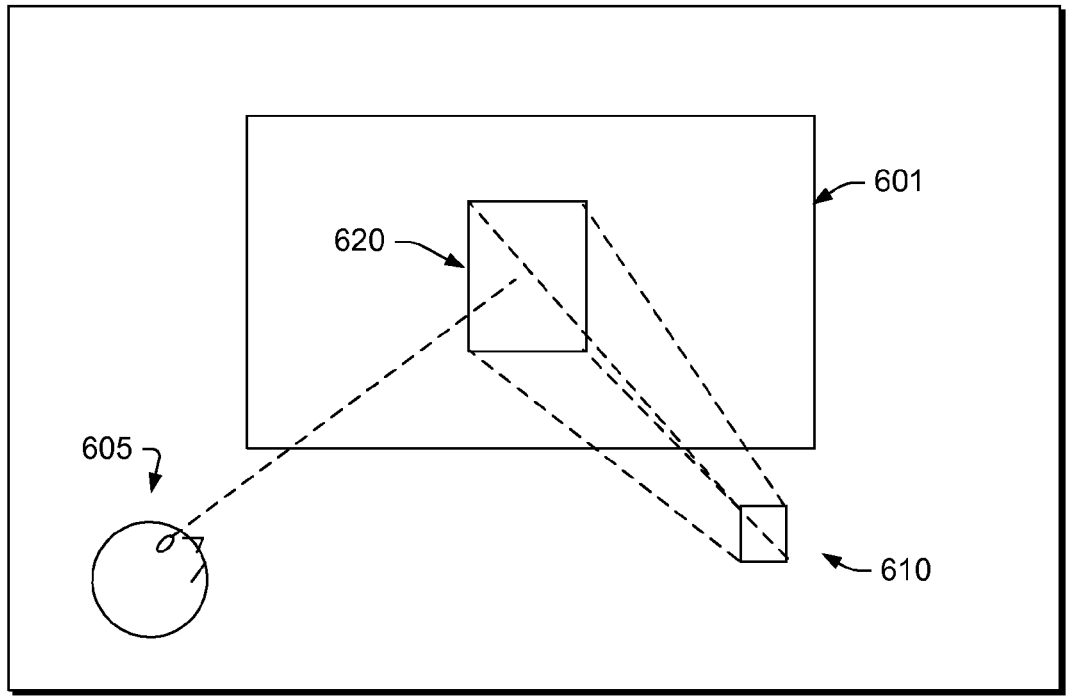
FIG. 6 is a series of diagrams of examples of projected images in environments.
Figure 6:
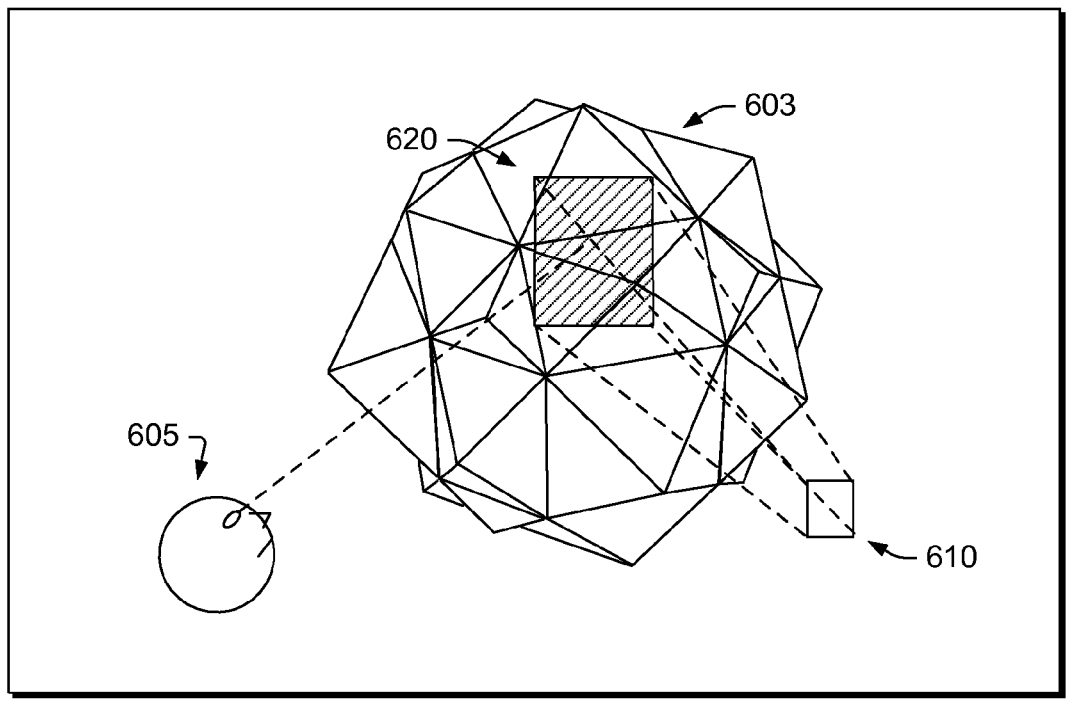

FIG. 6 shows an example of a planar surface 601, a viewer 605 and a projector 610 that projects an image 620 onto a portion of the planar surface 601. As an example, a method may implement one or more image correction algorithms, for example, to correct the image 620 with respect to the projection angle of the projector 610 with respect to the surface 601. As an example, a method may include determining a point of view of the viewer 605 and applying one or more image correction algorithms, for example, to correct the image 620 with respect to the point of view of the viewer 605. In such an example, the point of view of the viewer 605 may be with respect to the surface 601, with respect to the portion of the surface 601 onto which the image 620 is projected and/or with respect to the projector 610. As an example, a method may include correcting an image based at least in part on a change in a relationship, for example, a change in a spatial relationship of a viewer with respect to a surface, a projector, etc.

FIG. 6 shows an example of a surface 603, the viewer 605 and the projector 610 that projects the image 620 onto a portion of the surface 603. As shown in FIG. 6, the surface 603 may be a multifaceted surface (see, e.g., FIG. 5). As an example, a method may implement one or more image correction algorithms, for example, to correct the image 620 with respect to the projection angle of the projector 610 with respect to the surface 603. As an example, a method may include determining a point of view of the viewer 605 and applying one or more image correction algorithms, for example, to correct the image 620 with respect to the point of view of the viewer 605. In such an example, the point of view of the viewer 605 may be with respect to the surface 603, with respect to the portion of the surface 603 onto which the image 620 is projected and/or with respect to the projector 610. As an example, a method may include correcting an image based at least in part on a change in a relationship, for example, a change in a spatial relationship of a viewer with respect to a surface, a projector, etc.

Figure 7:
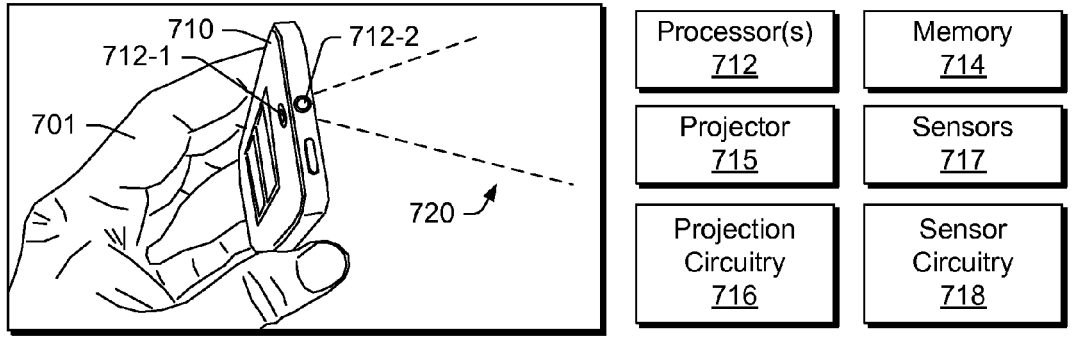
FIG. 7 is a series of diagrams of an example of a device, an example of a method and an example of another method.
Figure 7:
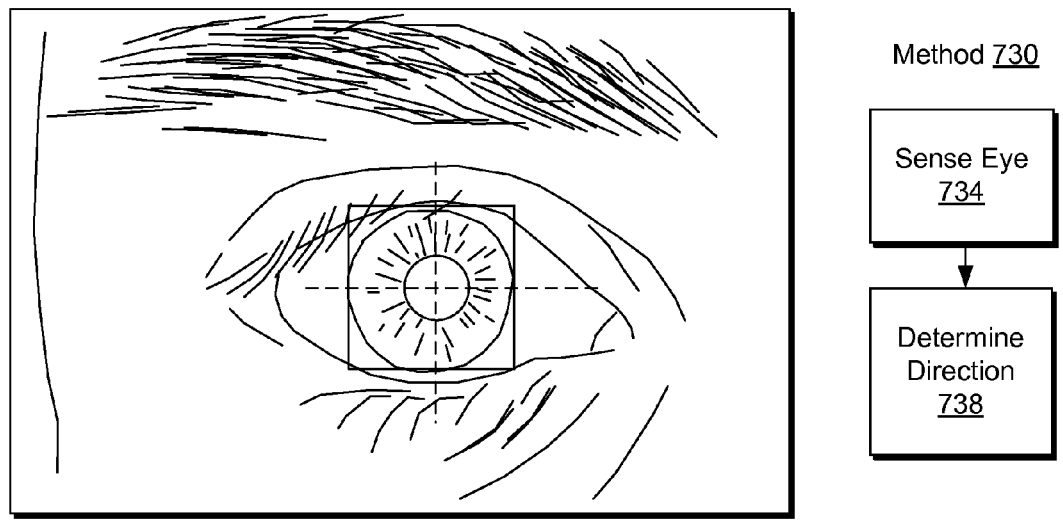
Figure 7:
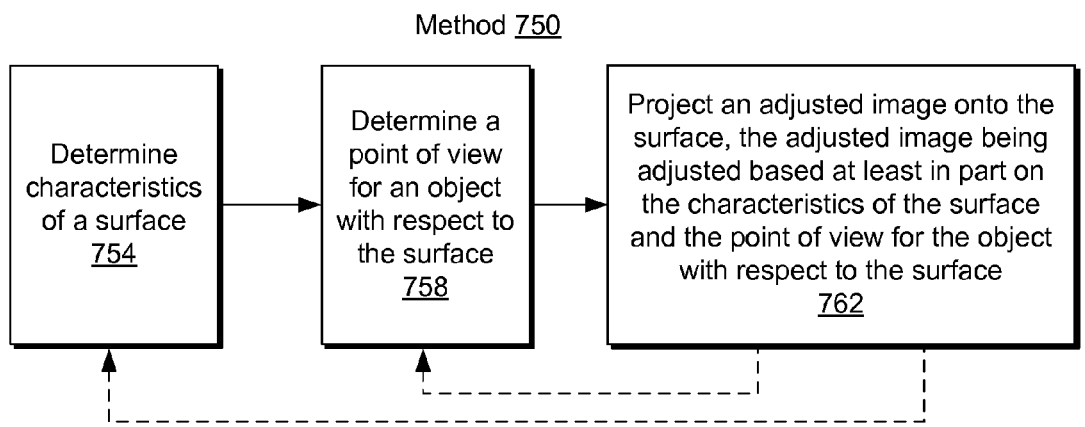

FIG. 7 shows an example of a device 710, an example of a method 730 and an example of a method 750. As shown in FIG. 7, the device 710 can include one or more processors 712, memory 714, a projector 715, projection circuitry 716, sensors 717 (e.g., a sensor 712-1, a sensor 712-2, etc.) and sensor circuitry 718. For example, the memory 714 may be operatively coupled to the processor 712 and the projector 715 may be operatively coupled to the processor 712 such that, for example, the processor 712 may cause information stored in the memory 714 to be projected by the projector 715. Further, the projection circuitry 716, the sensors 717 and the sensor circuitry 718 may be operatively coupled to the processor 712 such that sensed information may be processed to instruct the projection circuitry 716 to project a corrected image via the projector 715. In such an example, the projection circuitry 716 may be configured to implement one or more algorithms that can correct an image based at least in part on sensed information about a surface (e.g., as provided via one or more of the sensors 717 and the sensor circuitry 718).

As an example, the sensors 717 may include one or more sensors for sensing information related to a point of view of a viewer. For example, the sensors 717 may include an eye tracking sensor. As shown in FIG. 7, the method 730 can include a sense block 734 for sensing an eye and a determination block 738 for determining a direction based at least in part on sensing the eye. For example, an algorithm may include capturing an image and analyzing the image for indicia of an eye (e.g., an iris, a pupil, etc.). In such an example, the analysis may indicate a gaze direction for the eye. As an example, such a method may include eye tracking, for example, by acquiring multiple images (e.g., successively) and analyzing each of the images to determine whether a pupil (e.g., eye gaze) has changed with respect to time.

As shown in FIG. 7, the method 750 can include a determination block 754 for determining characteristics of a surface, a determination block 758 for determining a point of view for an object with respect to the surface and a projection block 762 for projecting an adjusted image onto the surface, the adjusted image being adjusted based at least in part on the characteristics of the surface and the point of view for the object with respect to the surface. As an example, the determination block 758 may implement one or more of the blocks, techniques, etc. as associated with the method 730. For example, the determination block 758 may include eye tracking (e.g., gaze tracking).

As an example, the method 750 may loop back to the block 758 and/or to the block 754 and update the block 762. For example, where tracking is implemented, the method 750 may be performed in a dynamic manner such that an adjusted image (e.g., corrected image) is updated with respect to a change in one or more of a characteristic of a surface and/or a point of view for an object (e.g., a viewer) with respect to a surface.

Figure 8:
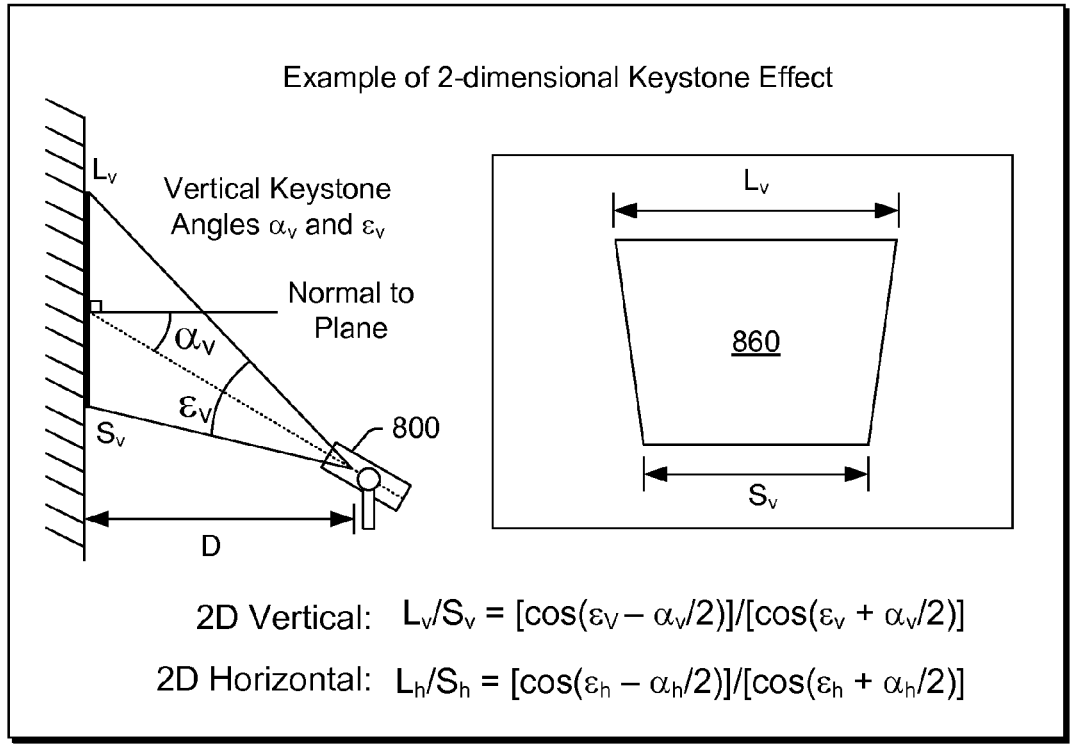
FIG. 8 is a series of diagrams of examples of keystoning and anti-keystoning equations.
Figure 8:
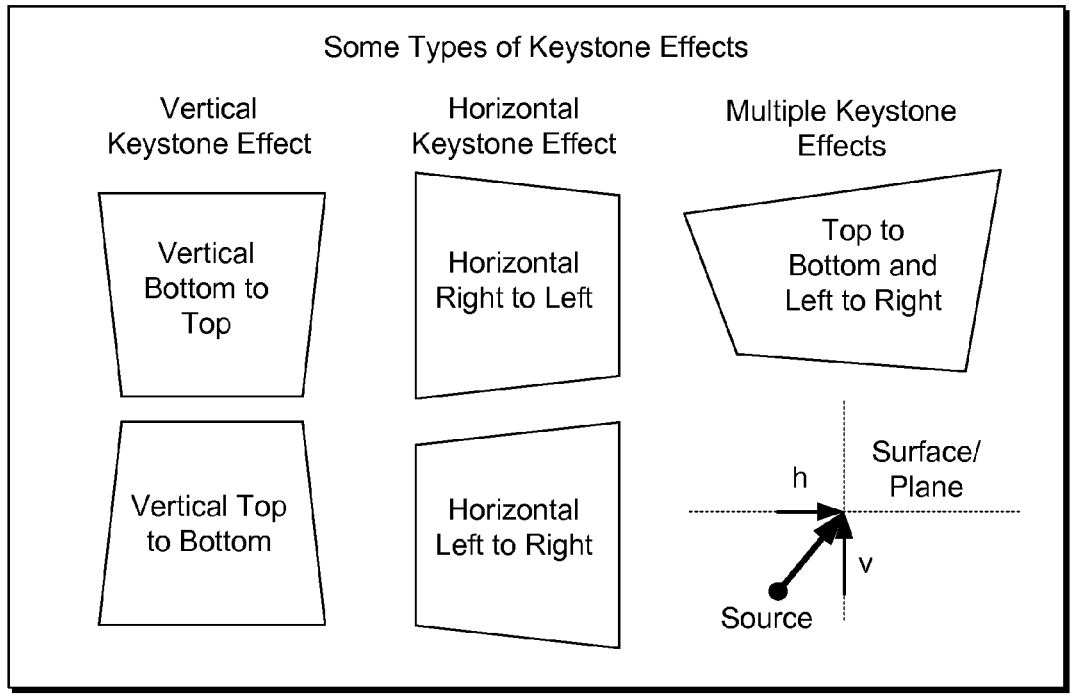

FIG. 8 shows an example of a projector 800 in a room that projects an image 860 onto a wall where the angle of projection differs from the normal of the wall. As shown, the keystone effect causes the length of the top of the image to be longer than the length of the bottom of the image. In this example, the image has a long top side (L) and a short bottom side (S). FIG. 8 also shows an example of a vertical keystone equation and an example of a horizontal keystone equation where each equation can approximate a distortion ratio of a length of a long side to a length of a short side of an image (e.g., $L_v$, $L_h$, $S_v$, $S_h$). In each of the keystone equations, the angle $\alpha$ represents a deviation between the projection angle and the normal of the projection surface and the angles represents a beam angle. In a two-dimensional example for vertical or horizontal displacement from a normal of the surface the image is being projected onto (e.g., normal at center of image), given the projection deviation angle and the beam angle, the distortion may be estimated by an appropriate one of the keystone equations. As indicated, a keystone effect may occur vertically, horizontally or along multiple directions. Where both vertical and horizontal displacements exist, then both equations may be used to correct image distortion. Further, as an example, a roll angle may be optionally accounted for when deciding whether or how to correct image distortion.

As an example, individual facets of a multifaceted surface may include characteristics that may be used in one or more equations, for example, to adjust an image or a portion thereof for projecting the image or the portion thereof onto the multifaceted surface. As an example, an equation may be a keystoning equation. As an example, a facet may include a boundary or border that may be or may be approximated as a polygon. As an example, a facet may be a surface of a polyhedron or other shaped object.

Figure 9:
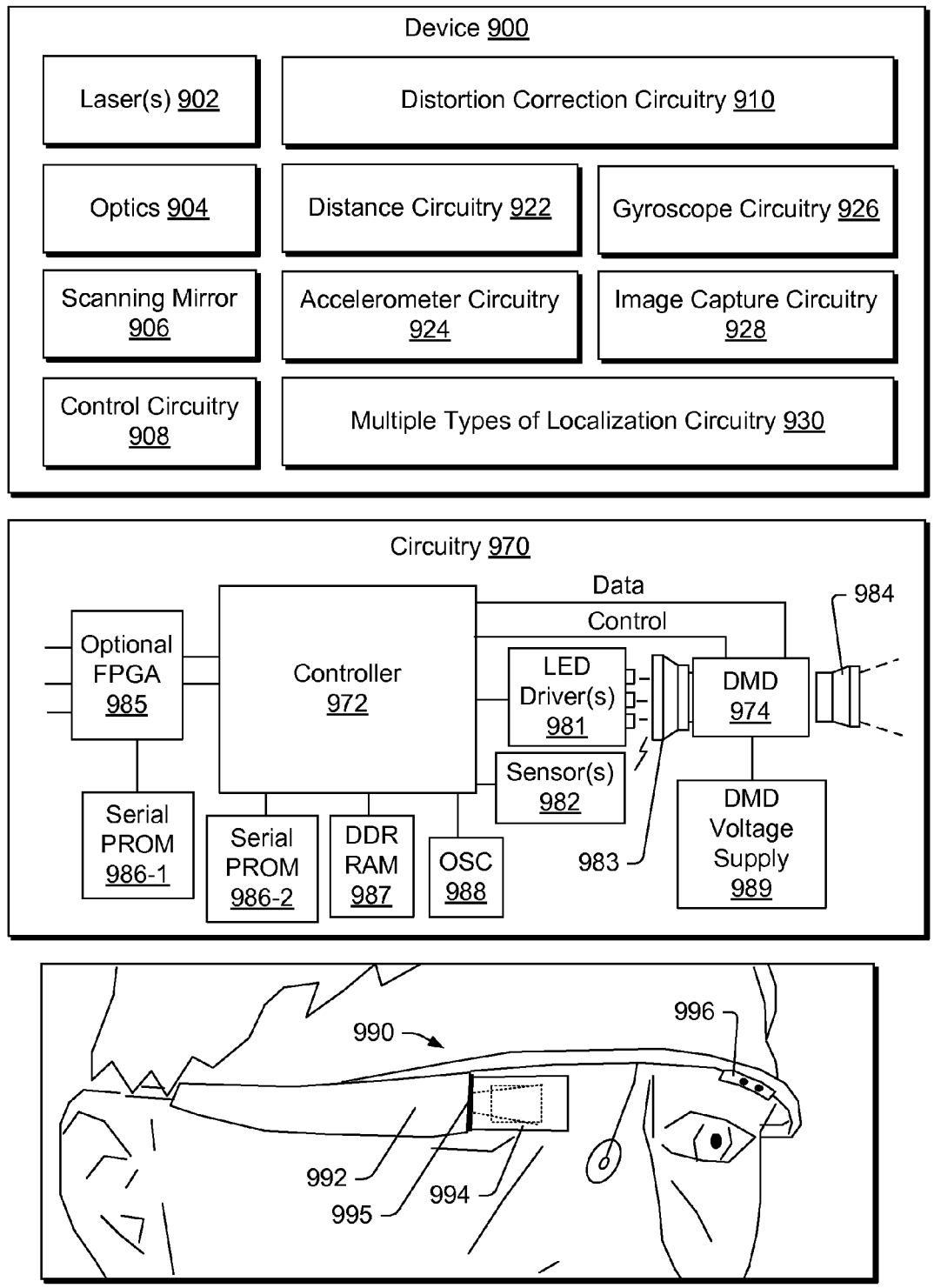
FIG. 9 is a diagram of an example of a device, an example of circuitry and an example of headwear or glasses.

FIG. 9 shows an example of a device 900, an example of circuitry 970 and an example of headwear 990 (e.g., "glasses"). As shown, the device 900 may include an embedded display 901, one or more lasers 902, optics 904, a scanning mirror 906, control circuitry 908, distortion correction circuitry 910 and one or more types of circuitry that can provide localization information for use by the distortion correction circuitry 910. For example, the device 900 may include distance circuitry 922, accelerometer circuitry 924, gyroscope circuitry 926, image capture circuitry 928 or multiple types of localization circuitry 930 (e.g., any combination of the foregoing types of circuitry).

As an example, a device may include components associated with one or more types of projection techniques such as, for example, a liquid crystal-based technique, a digital light processing-based technique, etc. As an example, a liquid-crystal-based technique may implement one or more technologies such as, for example, LCD, 3LCD, "liquid crystal on silicon", etc. As an example, a digital light processing-based technique may implement one or more technologies such as, for example, one or more DLP chips, which may be, for example, lamp-based, laser-based, LED-based, etc.

As an example, a DLP-based image projection technique may include generating an image via a matrix of mirrors (e.g., consider a semiconductor device such as a digital micromirror device). In such an example, individual mirrors may represent one or more pixels for an image (e.g., a projected image). As an example, a number of mirrors may define image resolution. As an example, a matrix of mirrors may be controlled by repositioning to reflect light (e.g., through a lens or onto a heat sink or "light dump"). In such an example, toggling mirrors between orientations (e.g., akin to on and off states) may provide for image characteristics (e.g., image grayscales, etc.).

In FIG. 9, the circuitry 970 includes a controller 972 that is operatively coupled to a digital micromirror device (DMD) 974. As an example, the controller 972 may transmit control information, data, etc. to the DMD 974. The controller 972 may also control one or more LED drivers (e.g., for LED emitters) 981, for example, using a pulse-width modulation (PWM) technique. As an example, the controller 972 may receive information from one or more sensors 982. In such an example, a control loop may be established where a portion of emitted light is sensed via the one or more sensors 982 and used in a control algorithm to control signals to the one or more LED drivers 981 (e.g., that drive LED emitters). As shown, the DMD 974 may be operatively coupled to receive light via source side optics 983 and to project light via projection side optics 984. As an example, the device 900 may include the circuitry 970.

As shown in FIG. 9, the circuitry 970 may include various other components such as, for example, an optional field-programmable gate array (FPGA) 985, one or more serial PROMs 986-1 and 986-2, DDR RAM 987, an oscillator (OSC) 988, and a voltage supply 989. As an example, the controller 974 may include one or more interfaces. For example, the controller 974 may include one or more interfaces that may include, for example, an I²C interface.

As an example, the controller 974 may be operatively coupled to a processor of a device (e.g., via one or more interfaces). For example, a mobile device may include a processor that is operatively coupled to a controller that controls projection circuitry. As an example, a processor, a controller, etc. may be configured to control a projector that can project an adjusted image onto a surface, for example, where the adjusted image is adjusted based at least in part on characteristics of the surface and a point of view for an object with respect to the surface. As an example, a processor, a controller, etc. may be configured to determine one or more characteristics of a surface (e.g., based on received information); to determine a point of view for an object with respect to the surface (e.g., based on received information); and to project an adjusted image onto the surface, for example, where the adjusted image is adjusted based at least in part on the characteristics of the surface and the point of view for the object with respect to the surface.

As an example, a mobile device may include projection circuitry. In such an example, the mobile device may conform to a form factor. As an example, a mobile device may be a smartphone. As an example, a mobile device may be a wristwatch or other type of watch. As an example, a mobile device may be headwear (e.g., "glasses"), for example, consider the headwear 990 of FIG. 9.

In the example of FIG. 9, the headwear 990 (e.g., "glasses") can include projection circuitry 992 (e.g., disposed in a housing) that may project may an image onto a near eye screen 994, which may optionally be coupled to a hinge 995 or other positioning mechanism, which may optionally be controllable (e.g., movable via one or more commands, etc.). As an example, the near eye screen 994 may be for personal viewing of images (e.g., projected images, which may include text, video, stills, graphics, etc.). As an example, the headwear 990 may include one or more sensors 996. As an example, the one or more sensors 996 may include an inward facing sensor and/or an outward facing sensor. For example, an inward facing sensor may provide for eye tracking (e.g., to determine eye gaze, a point of view of a wearer of the headwear 990, etc.) and, for example, an outward facing sensor may provide for sensing information that may be used to determine one or more characteristics of a surface (e.g., optionally including focus information such as distance or distances for focusing a projected image, etc.).

As an example, headwear may include a near eye screen and/or a projector (e.g., or optics, etc. associated therewith) that may be positioned to allow the projector to project an image beyond the near eye screen, for example, to project an image onto a surface other than the near eye screen (e.g., onto a wall, a user's body, etc.). As an example, such headwear may include one or more sensors operatively coupled to circuitry, for example, to determine one or more characteristics of a surface (e.g., based on sensed information); to determine a point of view for an object with respect to the surface (e.g., based on sensed information); and to project an adjusted image onto the surface, for example, where the adjusted image is adjusted based at least in part on the characteristics of the surface and the point of view for the object with respect to the surface.

As an example, the headwear 990 may include and/or be operatively coupled to circuitry that may be used to perform a method such as, for example, the method 730 of FIG. 7, the method 750 of FIG. 7, etc. As an example, headwear may include circuitry such as the circuitry 712, 714, 715, 716, 717 and 718 of FIG. 7, circuitry of the device 900 of FIG. 9, the circuitry 970 of FIG. 9, etc. As an example, headwear may include circuitry (e.g., accelerometer, gyroscope, etc.) that can acquire information for determining head position, head movement, etc., which may, for example, provide information as to direction of a projected image from a projector of the headwear.

As an example, an inward facing sensor may sense eye position, eye movement, etc. and use such sensed information to control projection of information to a near eye screen, a remote screen, etc. For example, a blink of an eyelid may be sensed and used to advance projection through a series of images. In such an example, a blink may be compared to one or more blink criteria (e.g., blink duration, number of blinks, etc.), which may be associated with one or more commands (e.g., to command an application executing on an operating system of a device, to command one or more circuits of headwear, etc.). As an example, an eye-based command may provide for moving a near eye screen, for example, causing the near eye screen 994 of the headwear 990 to pivot via the hinge 995 (e.g., where the hinge 995 may include a mechanism for pivoting the near eye screen 994 in for viewing by the wearer and/or out for projecting to a remote surface, clearing the field of view of the wearer, etc.).

As an example, an inward facing sensor may sense information for projecting a projected image in a desired direction, for example, to project in a manner that may follow a gaze of a wearer of headwear such as the headwear 990 of FIG. 9. For example, a wearer may gaze in a direction to instruct a projector to project an image onto a surface that may be a surface with desirable surface characteristics. As an example, where a wearer of projection headwear may be projecting to an audience with a number of members, the wearer may through turning her head and/or adjusting her eye gaze cause a projected image to move, for example, to be projected onto a surface or portion of a surface that may be desired for one or more of the members of the audience (e.g., where a single member has a question, the image may optionally be projected onto a surface closer to that member via a head position adjustment and/or an eye gaze adjustment of a wearer of headwear).

As an example, headwear may include one or more ear pieces and one or more nose pieces. As an example, headwear may include a power source such as a battery, for example, to power circuitry carried by and/or housed within one or more components of the headwear.

As an example, localization information may include vector direction and vector magnitude (e.g., with respect to a surface, an object, a viewer, etc.). As an example, given a defined environment (e.g., a model of an environment), a field of view angle (e.g., equivalent of a beam angle), information sufficient to determine deviation angle (or angles) between the normal of a projection surface and a projection angle and information sufficient to determine a point of view of a viewer with respect to the projection surface, a device 900 may correct for distortion using one or more algorithms. As an example, while the equation of FIG. 8 is shown in two-dimensions, a three-dimensional algorithm may be formulated and implemented by a device (e.g., optionally using two 2D equations). As an example, a method may optionally account for roll angle (see, e.g., pitch, yaw and roll) of a device, a projection surface, etc.

As an example, a projector may modulate one or more emitters to project an image. Such a projector may project an image by scanning a pixel at a time (e.g., akin to an electron beam of a CRT) or by optically spreading and then modulating a laser and scanning a line at a time (e.g., where the line is modulated in a manner akin to DLP). Whether an image is projected via a pixel-by-pixel or a line scanning process, an image correction technique may adjust a scanning process to present a corrected image (e.g., corrected to account for a surface that may impart distortion).

As an example, a particular projector may include three emitters for red, green and blue (RGB) color components, respectively, where beams of the emitters can be combined using an optical component or components. In such an example, the combined beam may be directed to a scanning mirror. To project an image, control circuitry may control the scanning mirror to generate each pixel of the image. As an example, correction circuitry (e.g., part of projection circuitry) may assist in controlling a scanning mirror, for example, to correct an image. Such circuitry may be configured to receive localization information (e.g., vector information) and correct for image distortion in real-time (e.g., due in part to a surface, a point of view, etc.).

As an example, a method may include determining characteristics of a surface; determining a point of view for an object with respect to the surface; and projecting an adjusted image onto the surface, the adjusted image being adjusted based at least in part on the characteristics of the surface and the point of view for the object with respect to the surface.

As an example, a method may include determining characteristics where the characteristics include a color of a surface. As an example, a method may include projecting an adjusted image (e.g., a corrected image) by adjusting at least one color of an image based at least in part on a color of a surface to form the adjusted image.

As an example, a method may include determining a shape of a surface, for example, as being one or more characteristics of the surface. As an example, a method may include projecting an adjusted image (e.g., a corrected image) by adjusting at least one aspect of an image based at least in part on a shape of a surface to form the adjusted image.

As an example, a method may include determining a change in a point of view for an object (e.g., optionally a viewer) with respect to a surface and reprojecting an adjusted image onto the surface, the adjusted image being based at least in part on one or more characteristics of the surface and the change in the point of view for the object with respect to the surface.

As an example, a method may include tracking an object for determining successive changes in a point of view for the object with respect to a surface and reprojecting an adjusted image onto the surface, the adjusted image being adjusted based at least in part on one or more characteristics of the surface and a change in the point of view for the object with respect to the surface.

As an example, a method may include determining characteristics of a surface; determining a point of view for an object with respect to the surface; and projecting an adjusted image onto the surface, the adjusted image being adjusted based at least in part on the characteristics of the surface and the point of view for the object with respect to the surface. Such a method may further include determining characteristics of another surface; determining a point of view for an object with respect to other surface; and projecting an adjusted image onto the other surface, the adjusted image being adjusted based at least in part on one or more of the characteristics of the other surface and the point of view for the object with respect to the other surface.

As an example, a method may include determining characteristics of a surface by receiving energy reflected by the surface. In such an example, the method may further include determining a shape of the surface based at least in part on the energy reflected by the surface and/or determining a color of the surface based at least in part on the energy reflected by the surface. As an example, a method may include transmitting energy and receiving a portion of the energy as energy reflected by a surface, for example, to determine one or more characteristics of the surface.

As an example, a method may include determining characteristics of a surface of a hand; determining a point of view for a viewer with respect to the surface of the hand; and projecting an adjusted image onto the surface of the hand, the adjusted image being adjusted based at least in part on the characteristics of the surface of the hand and the point of view for the viewer with respect to the surface of the hand. In such an example, the hand may be a hand of the viewer.

As an example, a method may include projecting an adjusted image onto a surface of a hand for the adjusted image to appear, for a point of view for an object with respect to the surface of the hand, as a substantially planar image. In such an example, the object may be a viewer and, optionally, the hand may be a hand of the viewer.

As an example, a method may include projecting an adjusted image by projecting a keystoned image. In such an example, the keystoned image may be a mosaic composed of individual tiles (e.g. image tiles). In such an example, each of the tiles may be corrected (e.g., adjusted) individually, for example, based in part on one or more characteristics of a surface onto which the tiles are projected (e.g., to form the mosaic).

As an example, a method can include determining characteristics of a surface and determining that the surface includes a plurality of individual surfaces. In such an example, the method may include projecting an adjusted image (e.g., a mosaic) by projecting multiple individually keystoned image portions (e.g., tiles) to respective individual surfaces of the plurality of individual surfaces. As an example, a plurality of individual surfaces may include at least one planar surface that is antiparallel to a projection plane of a device that projects an adjusted image. For example, a device may include an image plane that forms an image or, for example, image planes that form images.

As an example, a method may include projecting an adjusted video image. As an example, an image may be a key image, a delta image, etc., which may be associated with, for example, an image compression algorithm (e.g., of a video).

As an example, a system can include a processor; memory operatively coupled to the processor; sensor circuitry operatively coupled to the processor to determine characteristics of a surface and to determine a point of view for an object with respect to the surface; and projection circuitry operatively coupled to the processor to project an adjusted image onto the surface, the adjusted image being adjusted based at least in part on the characteristics of the surface and the point of view for the object with respect to the surface.

As an example, one or more computer-readable storage media can include computer-executable instructions to instruct a system to: determine characteristics of a surface; determine a point of view for an object with respect to the surface; and project an adjusted image onto the surface, the adjusted image being adjusted based at least in part on the characteristics of the surface and the point of view for the object with respect to the surface.

As an example, a method may include determining a point of view for a viewer with respect to a display of a device; and rendering a keystoned image onto the display of the device, the adjusted image being adjusted based at least in part on the point of view for the viewer with respect to the display of the device. In such an example, the method may include determining a point of view for the viewer by, at least in part, determining an orientation of at least one eye of the viewer.

As an example, a method may include determining a change in a point of view for a viewer with respect to a display of a device and reprojecting an adjusted image onto the display, the adjusted image being based at least in part on the change in the point of view for the viewer.

As an example, a system can include a processor; memory operatively coupled to the processor; a display operatively coupled to the processor; sensor circuitry operatively coupled to the processor to determine a point of view for a viewer with respect to the display; and display circuitry operatively coupled to the processor to render an adjusted image to the display, the adjusted image being adjusted based at least in part on the point of view for the viewer with respect to the display. In such an example, the system may include at least one sensor operatively coupled to the sensor circuitry. For example, a sensor may be a gaze sensor, for example, to track gaze of an eye or eyes.

As an example, one or more computer-readable storage media can include computer-executable instructions to instruct a system to: determine a point of view for a viewer with respect to a display of the system; and project a keystoned image onto the display of the system, the adjusted image being adjusted based at least in part on the point of view for the viewer with respect to the display of the system.

As an example, one or more computer-readable storage media may include computer-executable instructions to instruct a system to receive input information associated with an adjusted image. For example, consider an adjusted image as being a keyboard image, a keypad image or other image that includes keys. In such an example, a sensor of a device may sense a finger, a stylus, etc. as being in a location associated with a key and thereby as selecting the key as input. As an example, one or more computer-readable storage media may include instructions for projection of an adjusted image that may be an image of a graphical user interface (e.g., that includes one or more selectable portions for inputting information).

As described herein, various acts, steps, etc., may be implemented as instructions stored in one or more computer-readable storage media. For example, one or more computer-readable storage media can include computer-executable (e.g., processor-executable) instructions to instruct a device. A computer-readable medium may be a computer-readable medium that is not a carrier wave.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium.

Figure 10:
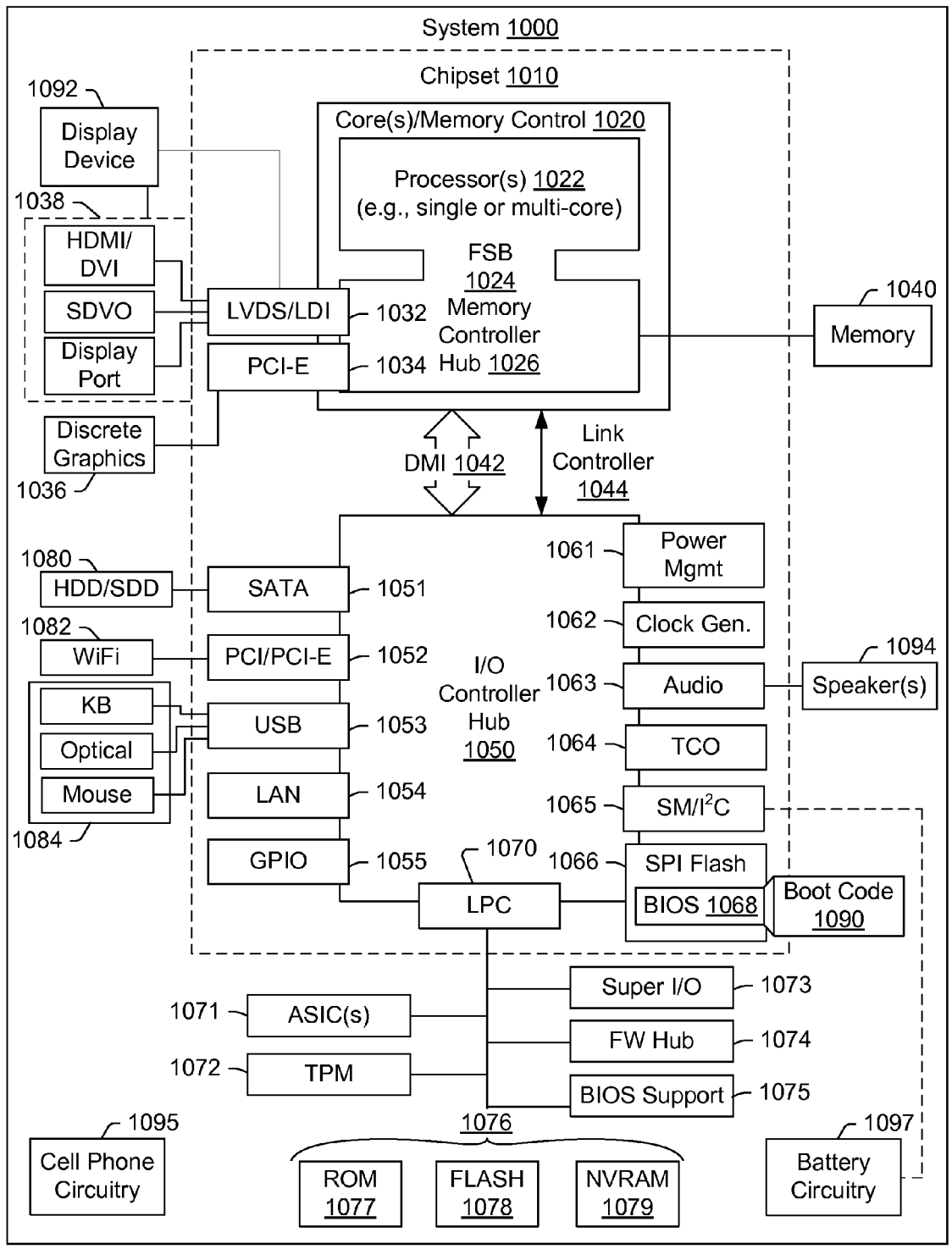
FIG. 10 is a diagram of an example of a system.

While various examples of circuits or circuitry have been discussed, FIG. 10 depicts a block diagram of an illustrative computer system 1000. The system 1000 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1000. As an example, a device such as one of the devices of FIG. 1, FIG. 2, FIG. 3, FIG. 4, etc. may include at least some of the features of the system 1000.

As shown in FIG. 10, the system 1000 includes a so-called chipset 1010. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 10, the chipset 1010 has a particular architecture, which may vary to some extent depending on brand or manufacturer. The architecture of the chipset 1010 includes a core and memory control group 1020 and an I/O controller hub 1050 that exchange information (e.g., data, signals, commands, etc.) via, for example, a direct management interface or direct media interface (DMI) 1042 or a link controller 1044. In the example of FIG. 10, the DMI 1042 is a chip-to-chip interface (sometimes referred to as being a link between a "northbridge" and a "southbridge").

The core and memory control group 1020 include one or more processors 1022 (e.g., single core or multi-core) and a memory controller hub 1026 that exchange information via a front side bus (FSB) 1024. As described herein, various components of the core and memory control group 1020 may be integrated onto a single processor die, for example, to make a chip that supplants the conventional "northbridge" style architecture.

The memory controller hub 1026 interfaces with memory 1040. For example, the memory controller hub 1026 may provide support for DDR SDRAM memory (e.g., DDR, DDR2, DDR3, etc.). In general, the memory 1040 is a type of random-access memory (RAM). It is often referred to as "system memory".

The memory controller hub 1026 further includes a low-voltage differential signaling interface (LVDS) 1032. The LVDS 1032 may be a so-called LVDS Display Interface (LDI) for support of a display device 1092 (e.g., a CRT, a flat panel, a projector, etc.). A block 1038 includes some examples of technologies that may be supported via the LVDS interface 1032 (e.g., serial digital video, HDMI/DVI, display port). The memory controller hub 1026 also includes one or more PCI-express interfaces (PCI-E) 1034, for example, for support of discrete graphics 1036. Discrete graphics using a PCI-E interface has become an alternative approach to an accelerated graphics port (AGP). For example, the memory controller hub 1026 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1050 includes a variety of interfaces. The example of FIG. 10 includes a SATA interface 1051, one or more PCI-E interfaces 1052 (optionally one or more legacy PCI interfaces), one or more USB interfaces 1053, a LAN interface 1054 (more generally a network interface), a general purpose I/O interface (GPIO) 1055, a low-pin count (LPC) interface 1070, a power management interface 1061, a clock generator interface 1062, an audio interface 1063 (e.g., for speakers 1094), a total cost of operation (TCO) interface 1064, a system management bus interface (e.g., a multi-master serial computer bus interface) 1065, and a serial peripheral flash memory/controller interface (SPI Flash) 1066, which, in the example of FIG. 10, includes BIOS 1068 and boot code 1090. With respect to network connections, the I/O hub controller 1050 may include integrated gigabit Ethernet controller lines multiplexed with a PCI-E interface port. Other network features may operate independent of a PCI-E interface.

The interfaces of the I/O hub controller 1050 provide for communication with various devices, networks, etc. For example, the SATA interface 1051 provides for reading, writing or reading and writing information on one or more drives 1080 such as HDDs, SDDs or a combination thereof. The I/O hub controller 1050 may also include an advanced host controller interface (AHCI) to support one or more drives 1080. The PCI-E interface 1052 allows for wireless connections 1082 to devices, networks, etc. The USB interface 1053 provides for input devices 1084 such as keyboards (KB), one or more optical sensors, mice and various other devices (e.g., microphones, cameras, phones, storage, media players, etc.). On or more other types of sensors may optionally rely on the USB interface 1053 or another interface (e.g., I²C, etc.). As to microphones, the system 1000 of FIG. 10 may include hardware (e.g., audio card) appropriately configured for receipt of sound (e.g., user voice, ambient sound, etc.).

In the example of FIG. 10, the LPC interface 1070 provides for use of one or more ASICs 1071, a trusted platform module (TPM) 1072, a super I/O 1073, a firmware hub 1074, BIOS support 1075 as well as various types of memory 1076 such as ROM 1077, Flash 1078, and non-volatile RAM (NVRAM) 1079. With respect to the TPM 1072, this module may be in the form of a chip that can be used to authenticate software and hardware devices. For example, a TPM may be capable of performing platform authentication and may be used to verify that a system seeking access is the expected system.

The system 1000, upon power on, may be configured to execute boot code 1090 for the BIOS 1068, as stored within the SPI Flash 1066, and thereafter processes data under the control of one or more operating systems and application software (e.g., stored in system memory 1040). An operating system may be stored in any of a variety of locations and accessed, for example, according to instructions of the BIOS 1068. Again, as described herein, a satellite, a base, a server or other machine may include fewer or more features than shown in the system 1000 of FIG. 10. Further, the system 1000 of FIG. 10 is shown as optionally include cell phone circuitry 1095, which may include GSM, CDMA, etc., types of circuitry configured for coordinated operation with one or more of the other features of the system 1000. Also shown in FIG. 10 is battery circuitry 1097, which may provide one or more battery, power, etc., associated features (e.g., optionally to instruct one or more other components of the system 1000). As an example, a SMBus may be operable via a LPC (see, e.g., the LPC interface 1070), via an I²C interface (see, e.g., the SM/I²C interface 1065), etc.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
   determining characteristics of a surface wherein the determining characteristics of the surface comprises determining that the surface comprises a plurality of individual surfaces;
   determining a point of view for an object with respect to the surface; and
   projecting an adjusted image onto the surface, the adjusted image being adjusted based at least in part on the characteristics of the surface and the point of view for the object with respect to the surface.

2. The method of claim 1 wherein the determining characteristics comprises determining a shape of the surface.

3. The method of claim 2 wherein the projecting the adjusted image comprises adjusting at least one aspect of an image based at least in part on the shape of the surface to form the adjusted image.

4. The method of claim 1 determining a change in the point of view for the object with respect to the surface and reprojecting an adjusted image onto the surface, the adjusted image being based at least in part on the characteristics of the surface and the change in the point of view for the object with respect to the surface.

5. The method of claim 1 further comprising tracking the object for determining successive changes in the point of view for the object with respect to the surface and reprojecting an adjusted image onto the surface, the adjusted image being adjusted based at least in part on the characteristics of the surface and a change in the point of view for the object with respect to the surface.

6. The method of claim 1 further comprising:
   determining characteristics of another surface;
   determining a point of view for an object with respect to the other surface; and
   projecting an adjusted image onto the other surface, the adjusted image being adjusted based at least in part on the characteristics of the other surface and the point of view for the object with respect to the other surface.

7. The method of claim 1 wherein the determining characteristics of the surface comprises receiving energy reflected by the surface.

8. The method of claim 7 further comprising determining a shape of the surface based at least in part on the energy reflected by the surface.

9. The method of claim 7 further comprising transmitting energy wherein the receiving receives a portion of the energy as energy reflected by the surface.

10. The method of claim 1 wherein the surface comprises a surface of a hand.

11. The method of claim 10 wherein the projecting an adjusted image comprises projecting the adjusted image onto the surface of the hand for the adjusted image to appear, for the point of view for the object with respect to the surface of the hand, as a substantially planar image.

12. The method of claim 1 wherein the projecting the adjusted image comprises projecting multiple individually keystoned image portions to respective individual surfaces of the plurality of individual surfaces.

13. The method of claim 1 wherein the plurality of individual surfaces comprise at least one planar surface that is antiparallel to a projection plane of a device that projects the adjusted image.

14. The method of claim 1 wherein the projecting an adjusted image comprises projecting an adjusted video image.

15. A system comprising:
   a processor;
   memory operatively coupled to the processor;
   sensor circuitry operatively coupled to the processor to determine characteristics of a surface and to determine a point of view for an object with respect to the surface wherein to determine characteristics of the surface comprises to determine that the surface comprises a plurality of individual surfaces; and
   projection circuitry operatively coupled to the processor to project an adjusted image onto the surface, the adjusted image being adjusted based at least in part on the characteristics of the surface and the point of view for the object with respect to the surface.

16. The system of claim 15 further comprising at least one sensor operatively coupled to the sensor circuitry.

17. One or more non-transitory computer-readable storage media comprising computer-executable instructions to instruct a system to:
- determine characteristics of a surface wherein to determine characteristics of the surface comprises to determine that the surface comprises a plurality of individual surfaces;
- determine a point of view for an object with respect to the surface; and
- project an adjusted image onto the surface, the adjusted image being adjusted based at least in part on the characteristics of the surface and the point of view for the object with respect to the surface.

18. The one or more non-transitory computer-readable storage media of claim 17 comprising computer-executable instructions to instruct a system to receive input information associated with the adjusted image.

19. The one or more non-transitory computer-readable storage media of claim 17 wherein the adjusted image comprises an image of a graphical user interface.

20. A method comprising:
- determining characteristics of a surface;
- determining a point of view for an object with respect to the surface;
- projecting an adjusted image onto the surface, the adjusted image being adjusted based at least in part on the characteristics of the surface and the point of view for the object with respect to the surface;
- tracking the object for determining successive changes in the point of view for the object with respect to the surface; and
- reprojecting an adjusted image onto the surface, the adjusted image being adjusted based at least in part on the characteristics of the surface and a change in the point of view for the object with respect to the surface.

21. A method comprising:
- determining characteristics of a surface;
- determining a point of view for an object with respect to the surface;
- projecting an adjusted image onto the surface, the adjusted image being adjusted based at least in part on the characteristics of the surface and the point of view for the object with respect to the surface;
- determining characteristics of another surface;
- determining a point of view for an object with respect to the other surface; and
- projecting an adjusted image onto the other surface, the adjusted image being adjusted based at least in part on the characteristics of the other surface and the point of view for the object with respect to the other surface.

* * * * *